(12) United States Patent
Sick et al.

(10) Patent No.: US 12,227,905 B2
(45) Date of Patent: Feb. 18, 2025

(54) METHOD FOR MAKING ARTIFICIAL TURF INFILL WITH ROUNDED OLIVE PIT FRAGMENTS

(71) Applicant: Polytex Sportbelage Produktions-GmbH, Grefrath (DE)

(72) Inventors: Stephan Sick, Baden-Baden (DE); Dario Grochla, Bochum (DE); Sven Hamann, Muehlheim (DE)

(73) Assignee: Polytex Sportbeläge Produktions-GmbH, Grefrath (DE)

( * ) Notice: Subject to any disclaimer, the term of this patent is extended or adjusted under 35 U.S.C. 154(b) by 0 days.

(21) Appl. No.: 18/068,105

(22) Filed: Dec. 19, 2022

(65) Prior Publication Data

US 2024/0084522 A1    Mar. 14, 2024

(30) Foreign Application Priority Data

Sep. 9, 2022    (EP) .................................... 22194956

(51) Int. Cl.
*E01C 13/08* (2006.01)
*B01J 2/12* (2006.01)

(52) U.S. Cl.
CPC ................. *E01C 13/08* (2013.01); *B01J 2/12* (2013.01)

(58) Field of Classification Search
CPC ............ E01C 13/02; B01J 2/12; A41G 1/009
See application file for complete search history.

(56) References Cited

U.S. PATENT DOCUMENTS

| | | | |
|---|---|---|---|
| 3,570,846 A * | 3/1971 | Weber et al. | ........... E01C 13/12 106/36 |
| 6,632,527 B1 | 10/2003 | McDaniel et al. | |
| 9,435,083 B2 * | 9/2016 | Packer | .................. D06M 23/08 |
| 9,845,577 B2 * | 12/2017 | Reddick | .................... C03C 3/04 |
| 10,822,751 B2 | 11/2020 | Volterrani et al. | |
| 10,822,752 B2 | 11/2020 | Wu | |
| 10,844,553 B2 * | 11/2020 | Wijers | ....................... B29B 9/12 |
| 11,427,971 B2 * | 8/2022 | Meherg | ....................... C08J 9/04 |
| 2002/0048676 A1 | 4/2002 | McDaniel et al. | |
| 2006/0121236 A1 | 6/2006 | Prevost | |
| 2008/0176010 A1 | 7/2008 | Sawyer et al. | |

(Continued)

FOREIGN PATENT DOCUMENTS

| | | |
|---|---|---|
| EP | 2917413 B1 | 7/2017 |
| EP | 3868955 A1 | 8/2021 |

(Continued)

OTHER PUBLICATIONS

Search Report for European Application No. 22194956.3 dated Feb. 7, 2023.

(Continued)

*Primary Examiner* — Gary S Hartmann
(74) *Attorney, Agent, or Firm* — Harness, Dickey & Pierce, P.L.C.

(57) ABSTRACT

A method of creating an artificial turf infill comprising providing olive pit fragments from an oil extraction process employing compressing the olives for extracting the olive oil, and tumbling the olive pit fragments to smoothen sharp edges of the olive pit fragments to produce rounded olive pit fragments.

14 Claims, 10 Drawing Sheets

(7 of 10 Drawing Sheet(s) Filed in Color)

(56) References Cited

U.S. PATENT DOCUMENTS

| | | | |
|---|---|---|---|
| 2008/0317978 A1* | 12/2008 | Smit | E01C 13/08 428/17 |
| 2010/0055461 A1 | 3/2010 | Daluise et al. | |
| 2015/0252537 A1* | 9/2015 | Volterrani | E01C 13/08 428/534 |
| 2018/0080183 A1* | 3/2018 | Aumonier | E01C 13/08 |
| 2019/0071546 A1* | 3/2019 | Sick | B01J 2/006 |
| 2020/0248412 A1* | 8/2020 | Sick | E01C 13/08 |
| 2021/0010209 A1* | 1/2021 | Volterrani | E01C 13/08 |
| 2021/0254290 A1* | 8/2021 | Smollett | E01C 13/08 |
| 2022/0042252 A1* | 2/2022 | Sick | E01C 13/08 |
| 2024/0084523 A1* | 3/2024 | Sick | E01C 13/08 |
| 2024/0084526 A1* | 3/2024 | Sick | E01C 13/08 |
| 2024/0092978 A1* | 3/2024 | Pfitzer | E01C 13/08 |
| 2024/0159000 A1* | 5/2024 | Ferrand | E01C 13/08 |
| 2024/0200282 A1* | 6/2024 | Sick | E01C 13/08 |

FOREIGN PATENT DOCUMENTS

| | | |
|---|---|---|
| EP | 4001506 A1 | 5/2022 |
| EP | 4220054 A1 | 8/2023 |
| WO | WO-2018/183756 A1 | 10/2018 |

OTHER PUBLICATIONS

"Sustainable infills from natural olive pits" Kompendium Sportplatz journal 3rd Edition, 2022, p. 107.

Office Action for European Application No. 22194956.3 dated May 22, 2023.

Office Action for European Application No. 22 194 956.3 dated Sep. 11, 2023.

Search Report for European Application No. 23164398.2 dated Jul. 13, 2023.

Office Action dated Mar. 19, 2024 issued in related European patent application No. 23164398.2.

International Search Report and Written Opinion thereof dated Nov. 29, 2023 for corresponding International Patent Application No. PCT/EP2023/074473.

Office Action dated Oct. 22, 2024 issued in European patent application No. 23164398.2.

* cited by examiner

METHOD FOR MAKING ARTIFICIAL TURF INFILL WITH ROUNDED OLIVE PIT FRAGMENTS

CROSS-REFERENCE TO RELATED APPLICATION

This application claims priority under 35 U.S.C. § 119 to European Patent Application No. 22194956.3, filed on Sep. 9, 2022, in the European Patent Office, the entire contents of which are hereby incorporated by reference.

FIELD OF THE INVENTION

The invention relates generally to an artificial turf, and, more particularly, to an artificial turf infill comprising olive pit material, to an artificial turf comprising said artificial turf infill, and a method of making said artificial turf infill.

BACKGROUND

Use of artificial turf for the surface of sport fields, natural lawn replacement for back yards and public squares, etc. is increasing rather rapidly due to the convenience and economic efficiency of maintenance compared to natural turf.

One of the problems associated with existing artificial turf designs is the use of synthetic materials like rubber and further polymer-based elastic particles as infill which can find their way into various waterways and water reservoirs both as macro-, meso- and microplastic-particles.

Heretofore some efforts have been made for the development of an infill that uses organic materials rather than elastic synthetic materials. See, for example, EP2917413B1 ("EP'413"), U.S. Pat. No. 10,822,751B2 ("US'751"), and U.S. Pat. No. 10,822,752B2 ("US'752") proposing various bio-based materials. The EP'413 and the US'751 patents describe the use of vegetable material comprising the rachis of cereal ear as infill, while the US'752 patent describes an infill which uses cellulosic fiber material from pine wood. EP3868955A1 patent application describes using olive pit particles as infill for artificial turf which are produced by crushing naturally occurring pits in a grinder, granulator, or cracker mill. The general concept of using olive pit particles is rather known since at least 2010 by the publication of US2010/055461 patent application which describes an artificial turf having organic particles of a group consisting of, coconut shells, ground pecan shells, ground peanut shells, ground corn cobs, and ground olive stones. See also the US2018/0080183, U.S. Pat. No. 6,632,527, US2002/0048676, US2006/0121236, US2008/0176010, and US2015/0252537 patent references which describe various bio-based material infills for artificial turfs.

The article "Sustainable infill from natural olive pits," published in the Kompendium Sportplatz journal 3rd Edition 2022, p. 107, describes grinding olive pits and using the generated olive particles as infill for an artificial turf.

Despite the above rather limited attempts to produce an artificial turf infill purely or predominantly comprising organic materials that has satisfactory performance characteristics in varying weather conditions over an extended period of time, to date there is no practical solution that can satisfy these requirements. Improved solutions are needed that employ organic infill that protects the environment, provides proper foot traction, reduced biodegradation and enhanced resistance to microbial infestations in moist and wet conditions.

SUMMARY OF THE INVENTION

The present invention provides an artificial turf infill, an artificial turf employing the artificial turf infill, and a method of forming the artificial turf infill in the independent claims. Various embodiments of the present invention are given in the dependent claims. Embodiments of the present invention provide new, improved solutions to the above problems associated with the prior art. According to an aspect of the present invention a method of creating an artificial turf infill is provided, the method comprising providing olive pit fragments, tumbling the olive pit fragments to produce rounded olive pit fragments, and using the rounded olive pit fragments as the artificial turf infill or as a component of the infill.

The tumbling may be performed at an effective tumbling intensity and for an effective period of time to smoothen the sharp edges of the olive pit fragments and generate olive pit particles having a size less than 63 μm in an amount of at least 0.5 wt %, in particular 1.0 wt % to 20.0 wt %, more in particular 1.0 wt % to 10.0 wt %, and most in particular 1.0 wt % to 2.0 wt % of a total olive pit material generated by the tumbling.

The rounded olive pit fragments may have a size of 0.5 mm or greater, in particular 0.5 mm to 4.0 mm, more in particular 0.5 mm to 2.5 mm, and most in particular 0.5 mm to 2.0 mm, and the rounded olive pit fragments may be in an amount of at least 80.0 wt %, in particular 90.0 wt % to 99.0 wt %, more in particular 95.0 wt % to 99.0 wt %, and most in particular 98.0 wt % to 99.0 wt % of the total olive pit material generated by the tumbling.

The total olive pit material generated by the tumbling may have a bimodal size distribution with a major mode and a minor mode. The major mode comprises the rounded olive pit fragments and has a peak between 0.5 mm to 4.0 mm, more in particular 0.5 mm to 2.5 mm, and most in particular 0.5 mm to 2.0 mm. The minor mode comprises the olive pit particles and has a peak at less than 63 μm.

In some embodiments, the method may further comprise thermally treating the olive pit fragments in a temperature of 80° C. to 250° C. According to some embodiments, thermal treatment involves heating the olive pit fragments to a temperature of 80° C. to 130° C., in particular 100° C. to 130° C., and more in particular 110° C. to 130° C.

Thermal treatment in this temperature range between 80° C. and 130° C. may have the advantage that any residual natural smell of the olive pits may be removed. It also reduces the amount of equilibrium moisture in the olive pit material and may result in some increase in the surface hardness and, hence, in the improvement of the tenacity of the olive pit fragments.

In some embodiments, thermal treatment means that the olive pit fragments are heated to a sufficiently high temperature, that not only their equilibrium moisture is reduced and any residual olive odor is eliminated, but also their lignin, cellulose and/or hemicellulose is chemically modified. Chemical modification of the olive pit structure may be measured by X-ray photoelectron analysis (XPS) of the oxygen to carbon ratio of the olive pit material. In some embodiments, thermally treated olive pit material means that the olive pit material has been sufficiently heated to show at least a 3%, preferably at least 5%, and more preferably 5% to 10% reduction in the oxygen to carbon ratio compared to thermally untreated olive pit material as measured by XPS analysis. It has been found that such higher temperature thermal treatment transforms the olive pit material to become (like tropical woods) more durable and resistant to decay in a moist/humid environment. It has been found that heating above a temperature of 130° C. is needed for this chemical modification to occur.

Thermal treatment at higher temperatures than 130° C. and preferably above 150° C. has the advantage that the antimicrobial resistance of the olive pit fragments is increased, and their hygroscopicity is reduced significantly. Also, the surface hardness and tenacity of the treated material is increased. The olive pit fragments become more durable, more resistant to biodegradation in moist and humid conditions and also more resistant to additional fracturing or attrition when used as infill in an artificial turf.

In some embodiments, the thermal treatment heats the olive pit material to a temperature higher than 150° C., in particular 160° C. to 250° C., and more in particular 180° C. to 250° C.

In some embodiments, the tumbling and the thermal treatment may be performed simultaneously in a thermo-tumbler apparatus.

In some embodiments, the thermal treatment may include feeding hot air, steam or superheated steam in the thermo-tumbler apparatus.

In some embodiments, the olive pit fragments may be products of an olive oil process using a press device. The olive oil press device compresses the olives to extract the oil from the olives and in the process the olive pit fragments are created. The olive pit fragments, after separation from the olive oil and the other by-products of the olive oil extraction process are fed into a tumbling apparatus to be tumbled and smoothen any sharp edges of the olive pit fragments. The tumbling process generates the olive pit particles which are olive pit material having a size less than 63 μm. Thus, the tumbling produces rounded and thermally treated olive pit fragments which are substantially free of sharp edges.

In some embodiments, the method further comprises mixing together with the olive pit fragments, or with the rounded olive pit fragments, or with the rounded and thermally treated olive pit fragments at least one other bio-based material including cork particles, and whole cherry pits, fragments, or mixtures thereof, and using the mixture as an artificial turf infill or a fraction of it.

In some embodiments, the infill comprises only bio-based materials and is free of any rubber, elastomeric, or polymer-based infill, and is preferably also free of any sand.

In some embodiments, the method further comprises mixing microporous zeolite particles together with the olive pit fragments, or with the rounded olive pit fragments or with the rounded and thermally treated olive pit fragments, and using the mixture as the artificial turf infill or as a component of the artificial turf infill.

In some embodiments, the method is free of a step which crushes or grinds the not-yet rounded olive pit fragments or the rounded olive-pit fragments.

In some embodiments, the method further comprises a sieving operation for reducing the amount of olive pit particles which are generated in the tumbling process and which have a size of less than 63 μm to an amount of 2.0 wt % or less, and in particular to an amount of 1.0 to 2.0 wt % of the total olive pit material in the infill.

According to some embodiments, the olive pit particles removed from the thermo-tumbler product are used as infill for a stabilization layer either alone or together with sand and zeolite, and preferably with zeolite only.

According to another aspect of the present invention, an artificial turf infill is provided which comprises rounded olive pit fragments. The artificial infill may be manufactured in a method of any one of the embodiments for manufacturing the infill with rounded olive pit fragments described herein.

In yet another aspect of the present invention, a kit for manufacturing artificial turf is provided. The kit comprises the artificial infill according to the invention, and at least one other component of an artificial turf installation. For example, the at least one other component of the artificial turf installation may be a carrier with the turf fibers, or sand material or some other material used in the artificial turf installation.

In yet another aspect of the present invention, an artificial turf is provided, the artificial turf comprising a carrier, artificial turf fibers integrated in the carrier, and the infill of as described above.

Yet another aspect of the present invention is directed to the use of the artificial turf infill for forming at least one infill layer of an artificial turf.

Yet another aspect of the present invention, is directed to a method of creating an artificial turf, comprising installing an artificial turf and applying the artificial turf infill created according to the inventive method on a carrier of the installed artificial turf or on an existing infill layer. The infill may comprise at least a mixture of the rounded olive pit fragments and of the olive pit particles. The applying of the artificial turf infill is performed in a single step, and the method allows the olive pit particles in the applied infill to segregate from the rounded olive pit fragments and automatically trickle down into the voids between the fragments.

The artificial turf may have a two-layer structure comprising a stabilization layer and a performance layer on top of the stabilization layer. At least one of the stabilization layer and the performance layer may comprise microporous zeolite particles and/or the performance layer may comprise the at least one other bio-based material.

In yet another aspect of the present invention, a method of using an artificial turf comprising the inventive artificial turf infill is provided, the method comprising watering the artificial turf, wherein the microporous zeolite particles are adapted to store water in their pores during the watering and to release gradually through evaporation the stored water, thus, cooling the artificial turf.

Unlike the prior art, where olive pits are crushed into sharp, and comparatively very small infill particles using an extra crushing step, the present invention uses larger size olive pit fragments from olive oil extraction processes without applying an additional crushing step. The sharp edges of the olive pit particles may feel uncomfortable to the skin of the artificial turf users and may even cause injury to the skin of the turf users.

Unlike the prior art, the present invention further treats the olive pit fragments for rounding their edges, make them smoother before using them as infill.

Unlike the prior art, according to embodiments of the present invention olive pit fragments are thermally treated for removing the residual odor from the olives, increasing their surface hardness, making them antimicrobially resistant, and attrition resistant.

Unlike the prior art, the method of the present invention is free of a step which crushes or grinds the not-yet rounded olive pit fragments or the rounded olive-pit fragments.

These and other features and advantages of the present invention will become better understood from the following detailed description of the invention in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the following, embodiments of the invention are explained in greater detail, by way of example only, making reference to the drawings in which.

DETAILED DESCRIPTION OF THE INVENTION

Figure 1:
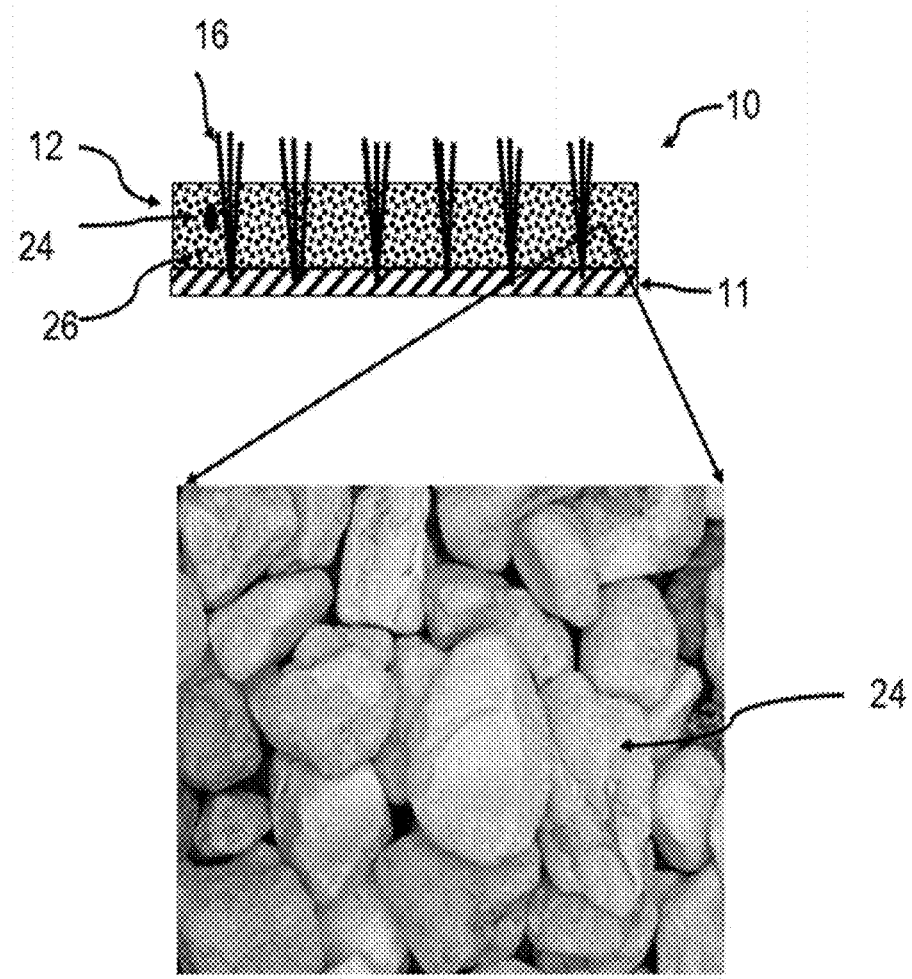
FIG. 1 shows an artificial turf having an infill from rounded and thermally treated olive pit fragments according to some embodiments of the present invention.

Like numbered elements in these figures are either equivalent elements or perform the same function. Elements which have been discussed previously may not necessarily be discussed in later figures.

According to its broadest aspects the present invention provides a bio-based infill that exhibits improved performance characteristics in varying weather conditions over an extended period of time. The bio-based infill includes an olive pit material and, in some embodiments, at least one other bio-based infill. In some embodiments the bio-based material includes microporous zeolite particles. The present invention further provides a method for making the artificial turf infill.

In some embodiments, the olive pit material is prepared using olive pit fragments generated in an oil extraction process which uses compression for extracting the olive oil. For example, the oil extraction process may employ an olive press. The olive pit fragments may have sharp edges which are created when the olive pits break under the compression force in the olive press. In some embodiments, the present invention uses a tumbling treatment of the olive pit fragments to smoothen their sharp edges, and provide rounded olive pit fragments which are substantially free of any sharp edges. The same tumbling process may also be used for any additional bio-based material. In some embodiments, the additional bio-based material may be tumbled together with the olive pit fragments to enhance the effectiveness of the tumbling process in rounding the sharp edges of the olive pit fragments. In some embodiments, the artificial turf infill comprises the rounded olive pit fragments prepared by the tumbling treatment process.

Rounded as this term is used here, means that the fragments do not have sharp edges which can cause skin injury to the users of the artificial turf.

According to embodiments, rounded fragments are fragments generated in an abrasive process, in particular by tumbling. As a consequence of tumbling, traces of tumbling may be visible on the surface of the fragments.

The tumbling of the olive pit fragments generates an olive pit material having bimodal size distribution with a major mode comprising rounded olive pit fragments having a size greater than 0.5 mm, in particular 0.5 mm to 4.0 mm, more in particular 0.5 mm to 2.5 mm, and most in particular 0.5 mm to 2.0 mm. A minor mode of the bimodal distribution comprises olive pit particles having a size of less than 63 μm.

According to embodiments, the tumbling is controlled to generate the olive pit particles having a size less than 63 μm in an amount of at least 0.5 wt %, in particular 1.0 wt % to 20.0 wt %, more in particular 1.0 wt % to 10.0 wt %, and most in particular 1.0 wt % to 2.0 wt % of a total olive pit material generated by the tumbling. Controlling the tumbling includes controlling the tumbling intensity and the duration of the tumbling among other things. Other parameters may include the presence or absence of other materials and the design characteristics of the tumbling apparatus such as internal design, size, and the presence of any baffles.

In some embodiments, the olive pit material comprising the olive pit fragments is thermally treated. The thermal treatment may be performed simultaneously with the tumbling treatment or separately from the tumbling treatment.

The conditions of the thermal treatment may be modified to adjust its effects on the moisture and chemical composition of the olive pit material which in turn affect the properties of the olive pit fragments.

The tumbling and/or thermal treatments allow adjusting the properties of the infill to improve the overall design of an artificial turf. For example, depending on turf pile height, gauge, fiber density and other characteristics of an artificial turf, the infill may be modified as may be needed by changing the size, roundness, surface hardness, moisture content and even chemical composition of the olive pit fragments. These adjustments can be done by changing the time, and intensity of the tumbling and/or of the thermal treatments.

The removal of the sharp edges via the tumbling process in combination with the thermal treatment of the olive pit fragments results in an olive pit material that when added as infill in an artificial turf exhibits an exceptional balance of traction, energy absorption, stable foot and energy restitution characteristics which can meet the standards for professional sport fields artificial turfs, including soccer, rugby, American football and the like. In this regard, it is believed, without wishing to be bound by theory, that the rounded surface hardened fragments allow a controlled rolling movement against each other, thus preventing excessive friction with the shoes of the athletes using the turf. At the same time, the rounded surface hardened fragments provide sufficient support and stable footing.

The olive pit material of embodiments of the invention can be used as infill for artificial turfs for professional sport fields, however, it can also be used in other applications such as, for example, artificial turfs in parks and private gardens.

According to some embodiments of the present invention, an artificial turf infill is provided comprising rounded and thermally treated olive pit fragments.

According to some embodiments, the infill comprises rounded and thermally treated olive pit fragments and optionally whole olive pits. The whole pits are olive pits which did not break during the oil extraction process or during the thermo-tumbling treatment.

According to some embodiments, the infill comprises rounded and thermally treated olive pit fragments, olive pit particles and optionally also some whole olive pits.

It is noted that the size of the fragments can be adjusted within the aforementioned ranges to meet the specific design requirements of an artificial turf which may also depend on the length of the turf fibers and the density of the turf fibers. One of the advantages of the present invention is that the size, surface hardness, and degree of smoothness (or roughness) of the fragments, can be customized to meet the requirements of any particular artificial turf design by adjusting the processing conditions of the tumbling and thermal treatments.

According to some embodiments, an "olive pit particle" is a piece of olive pit material with a size of less than 63 μm in size (larger dimension or diameter). It is noted that having the olive pit particles in the infill is generally advantageous because they tend to settle and form a lower stabilization layer which can eliminate the need for a stabilization layer of sand which is used conventionally in existing artificial turf infill systems. An infill without sand is desirable because sand tends to stick very tightly to the other artificial turf material (especially to the backing of the artificial turf) and can damage the shredders used to shred the artificial turf material when the artificial turf is recycled at the end of its useful life. Also, the process of installing the artificial turf is simplified because a step of adding a sand layer can be eliminated.

According to some embodiments, the total amount of olive pit material in the infill comprises at least 80.0 wt %, in particular 90.0 wt % to 99.0 wt %, more in particular 95.0 wt % to 99.0 wt %, and most in particular 98.0 wt % to 99.0 wt % of the rounded and thermally treated olive pit fragments. Also, the olive pit particles may be in an amount of at least 0.5 wt %, in particular 1.0 wt % to 20.0 wt %, more in particular 1.0 wt % to 10.0 wt %, and most in particular 1.0 wt % to 2.0 wt % of the total weight of the olive pit material.

According to some embodiments, the total amount of olive pit material in the infill comprises 95.0 wt % to 99 wt % of the rounded and thermally treated olive pit fragments having a size of 0.5 mm to 2.0 mm and olive pit particles having a size of less than 63 μm, in an amount of 1.0 wt % to 2.0 wt % of the total weight of the olive pit material.

According to some embodiments, the total amount of olive pit material in the infill comprises 98.0 wt % to 99.0 wt % of the rounded and thermally treated olive pit fragments having a size of 0.5 mm to 2.0 mm and olive pit particles having a size of less than 63 μm, in an amount of 1.0 wt % to 2.0 wt % of the total weight of the olive pit material.

According to some embodiments, the rounded and thermally treated olive pit fragments are obtained by a thermo-tumbling treatment of olive pit fragments. The olive pit fragments may be formed in an olive oil extraction process which employs a compression operation of the olives for extracting oil from the olives. The compression oil extraction process causes the olive pits to break creating the olive pit fragments which generally may have sharp edges. The olive pit fragments are separated from the other products of the olive oil extraction process, i.e., the extracted olive oil, the pulp and the skin of the olives and are subjected to the thermo-tumbling treatment. The thermo-tumbling treatment smoothens the sharp edges of the fragments. Olive pit particles having a size of less than 63 μm may be generated during the tumbling treatment. According to some embodiments, the thermo-tumbler product including the rounded olive pit fragments and the olive pit particles obtained from the thermo-tumbling treatment are sieved to remove at least partially some of the olive pit particles.

According to some embodiments, an artificial turf infill is provided which comprises, in addition to the rounded and thermally treated olive pit fragments, at least one further bio-based material including pit fragments of at least one other stone-containing fruit (i.e., other than olives), wherein the pit fragments of the further bio-based material have a different elasticity than the rounded and thermally treated olive pit fragments.

According to some embodiments, the at least one further bio-based material comprises cork particles, cherry pit fragments and combinations thereof. The cork and cherry pit fragments may be subjected to the same tumbling and thermal treatments as the olive pit fragments. The cork and cherry pit fragments may be subjected to the same tumbling and thermal treatments as the olive pit fragments, for example, by adding them in the same thermo-tumbler apparatus together with the olive pit fragments. According to some embodiments, the infill fragments made of the further bio-based material may be larger than the rounded and thermally treated olive pit fragments. According to some embodiments, the infill fragments made of the further bio-based material may have a size (largest dimension or diameter) of 0.5 to 4.0 mm, in particular 0.5 to 3.0 mm.

According to an aspect of the present invention, an artificial turf is provided using the inventive artificial turf infill. According to some embodiments, the artificial turf may comprise a stabilization layer comprising or consisting of the olive pit particles. In some embodiments, the stabilization layer may also include particles of the at least one other bio-based material. The olive pit particles and when used the particles of the at least one other bio-based material may be obtained from the thermo-tumbling treatment. The artificial turf may also comprise a performance infill layer positioned over the stabilization infill layer. The rounded and thermally treated olive pit fragments may form the performance infill layer. The performance infill layer may cover the stabilization layer. In some embodiments, the performance infill layer may also include fragments of the at least one other bio-based material in addition to the rounded and thermally treated olive pit fragments. The rounded and thermally treated olive pit fragments and the fragments of the other bio-based material may be obtained from the same tumbling and thermal treatments.

According to some other embodiments the artificial turf may comprise an infill layer made of the rounded and thermally treated olive pit fragments. In yet some other embodiments the artificial turf may comprise an infill layer made of the rounded and thermally treated olive pit fragments and fragments of the at least one other bio-based material.

Preferably, the artificial turf comprises an infill which consists entirely of bio-based materials.

A "bio-based material" as used herein is a material wholly or partly derived from materials of biological origin, excluding materials embedded in geological formations and/or fossilized materials. In particular, bio-based materials can be materials which predominantly (>50 wt %) comprise or consist of biodegradable and/or compostable materials, and, in some embodiments, materials only consisting of compostable materials.

Hence, unlike typical artificial turf infill, the present invention infill can be made totally free of any sand, or of any non-bio-based, synthetic infill like the rubber, elastomeric, or polymer-based materials used in infills of the state of the art.

According to another aspect of the present invention, zeolite particles may be added in the infill of the artificial turf. Preferably, the zeolite particles are added in the stabilization layer. Preferably, the zeolite particles may be microporous zeolite particles. These microporous zeolite particles provide a cooling effect via storing water in their pores during rainy weather conditions or when the turf is watered, and slowly releasing via evaporation of the stored water during hot days.

In some embodiments, an infill is provided which is made of biodegradable material, and is essentially free of any synthetic, non-biodegradable material. Essentially free means that less than 1 wt %, preferably less than 0.5 wt % of the infill may be synthetic, non-biodegradable material. Other natural materials such as zeolite and sand may be added in the infill.

In some embodiments, an infill is provided which is made of compostable material, and is essentially free of any synthetic, non-biodegradable material. Essentially free means that less than 1 wt %, preferably less than 0.5 wt % of the infill may be synthetic, non-biodegradable material. Other natural materials such as zeolite and sand may be added in the infill.

According to yet another aspect of the present invention, the rounded and thermally treated olive pit fragments are made accordingly to a method comprising providing olive pit fragments from an oil extraction process compressing the olives for extracting the olive oil, and tumbling the olive pit fragments to smoothen sharp edges of the olive pit fragments to produce rounded olive pit fragments. For example, the method may include feeding the olive pit fragments in a tumbler, and tumbling them at an effective tumbling intensity and for an effective amount of time to smooth out substantially all sharp edges of the olive pit fragments and produce rounded and thermally treated olive pit fragments.

According to some embodiments, the tumbling intensity may be adjusted to effectively remove all sharp edges of the olive pit fragments. The tumbling is performed at an effective tumbling intensity and for an effective amount of time inside the tumbler apparatus to generate rounded olive pit fragments which are substantially free of any sharp edges. As a result of the smoothening of the sharp edges the very small size olive pit particles are formed.

The tumbling generates an olive pit material having a bimodal size distribution.

In some embodiments, the method may further comprise thermally treating the olive pit fragments. According to some embodiments, thermal treatment involves heating to a temperature of temperature of 80° C. to 130° C., in particular 100° C. to 130° C., and more in particular 110° C. to 130° C.

Thermal treatment in this temperature range between 80° C. and 130° C. may remove any residual natural smell of the olive pits and may also reduce the amount of equilibrium moisture in the olive pit material.

In some embodiments, thermal treatment means that the olive pit fragments are heated to a sufficiently high temperature, that the heat treatment not only reduces the equilibrium moisture of the olive pit material and eliminates any residual olive odor, but also modifies their chemical structure. Chemical modification of the olive pit structure may be measured by X-ray photoelectron analysis (XPS) of the oxygen to carbon ratio of the material. In some embodiments, thermally treated olive pit material means that the olive pit material has been sufficiently heated to show at least a 3%, preferably at least 5%, and more preferably 5% to 10% reduction in the oxygen to carbon ratio compared to thermally untreated olive pit material as measured by XPS analysis. It has been found that such higher temperature thermal treatment transforms the olive pit material to become (like tropical wood) more durable and resistant to decay in a moist/humid environment. It has been found that heating above a temperature of 130° C., and preferably above 150° C. is needed for this chemical modification to occur.

Thermal treatment at higher temperatures than 130° C., and preferably higher than 150° C. has the advantage that the antimicrobial resistance of the olive pit fragments is increased, and their hygroscopicity is reduced significantly. Also, the surface hardness of the treated material is increased. The olive pit fragments become more durable, more resistant to biodegradation in moist and humid conditions and also more resistant to additional fracturing or attrition when used as infill in an artificial turf.

In some embodiments, the thermal treatment heats the olive pit material to a temperature higher than 150° C., in particular 160° C. to 250° C., and more in particular 180° C. to 250° C.

Thermal treatment at these higher temperatures has the benefit of increasing the resistance of the olive pit fragments against moisture-induced biodegradation, which is particularly beneficial in humid regions or when the artificial turf infill comprises a zeolite which is irrigated frequently before and during a game to cool the sports field and the players. Although not wishing to be bound by any particular theory, it is believed that heat treatment at the elevated temperatures above 130° C., and preferably above 150° C. not only removes any residual moisture or odors but, more importantly, also changes the chemical structure/composition of the hemicellulose, cellulose and lignin components of the olive pit fragments which results in substantially reduced hygroscopicity or effectively almost zero hygroscopicity for the thermally treated olive pit material at such temperatures. As a result, the olive pit material becomes resistant to natural biodegradation and is also much less likely to suffer from microbial infestations. These properties make the thermally treated artificial turf infill of the present invention particularly suitable to be used with microporous zeolite particles that can be used to store water during watering of the turf and release it gradually thereafter, thus, cooling the turf and the athletes (or users) of the turf without reducing the useful lifespan of the infill (and of the turf) due to the increased moisture conditions. Thus, the artificial turf infill and artificial turf using the artificial turf infill of the present invention can be watered more frequently and also last longer than existing turfs.

Heating for the thermal treatment may be performed with any suitable means. In some embodiments, hot air, steam or superheated steam may be fed inside a tumbling apparatus and the heat treatment may be performed simultaneously with the tumbling treatment. In some other embodiments the heat treatment may be performed separately and independently of any tumbling treatment, for example in an oven. The temperature and duration of the thermal treatment may be adjusted as may be needed for adjusting the effects of the heat treatment on the properties of the olive pit material.

In some embodiments the duration of the tumbling treatment of the olive pit fragments may range for a period of 1 minute to 8 minutes, and in particular for a period of 2 minutes to 6 minutes. For example, the tumbling treatment may in some embodiments last for a period of 2.5 minutes to 3 minutes. However, these time periods are provided only as examples, and longer periods may be used without departing from the scope of the present invention. For example, generally, the tumbling and/or thermal treatment may last from a few minutes to a few hours. In an embodiment, the olive pit fragments are thermally treated at a temperature of higher than 150° C., in particular 160° C. to 250° C., and more in particular 180° C. to 250° C. for a period of time of 1 to 6 hours. The thermal treatment may be performed in a continuous or batch process. The thermally treated olive pit fragments may be analyzed to ensure adequate chemical modification via XPS O/C ratio analysis and/or NMR cellulose crystallinity analysis. In some embodiments, thermal treatment is continued until at least a 3%, preferably at least 5%, and more preferably 5% to 10% reduction in the oxygen to carbon ratio of the thermally treated olive pit fragments is obtained as measured by XPS analysis. According to some embodiments, the method comprises sieving the thermo-tumbler product to remove at least some of the thermo-tumbler product olive pit particles having a size of less than 63 μm. The removed olive pit particles may be used for forming a stabilization layer for the infill.

In a preferred embodiment, the product from the thermo-tumbler is used without separation or sieving to form an infill layer for an artificial turf. According to some embodiments, the method further comprises mixing together with the olive pit fragments, or the rounded olive pit fragments or the rounded and thermally treated olive pit fragments, at least one other bio-based material including cork particles, and cherry pits whole, fragments, or mixtures thereof.

For example, fragments of at least one other bio-based material may also be fed in a thermo-tumbler and mixed together with the olive pit fragments.

According to some embodiments, at least one of sand, and zeolite, preferably just zeolite and, in particular, microporous zeolite particles, may be mixed together with the olive pit fragments, or the rounded olive pit fragments or the rounded and thermally treated olive pit fragments and the at least one other bio-based material.

The microporous zeolite particles are added in an amount of 1.0 to 30.0 wt %, in particular 5.0 to 25.0 wt %, and more in particular 10.0 to 20.0 wt % of the total amount of the infill. The zeolite is added for providing a cooling effect in the infill because the zeolite microporous material absorbs water in rainy, wet conditions and releases by evaporation in hot sunny days to cool down the infill and the turf. The zeolite may also improve the overall shaping of the olive pit fragments and of any additional bio-based additional stones by providing added abrasion during the tumbling process.

According to some embodiments, the infill comprises only bio-based materials and is free of any rubber, elastomeric, or polymer-based infill, and is preferably also free of any sand.

The method for making the artificial turf infill according to the present invention does not include any step of crushing or grinding the not-yet rounded olive pit fragments or the rounded olive-pit fragments.

According to another aspect of the present invention, a method of use of the artificial turf infill is provided wherein the artificial turf infill can be used to form the infill of an artificial turf.

According to some embodiments, a method for forming an infill for an artificial turf is provided, the method comprising:
  providing an infill mixture comprising:
    component a including the rounded and thermally treated olive pit fragments and optionally fragments of at least one additional bio-based material,
    component b comprising microporous zeolite particles, and
    component c comprising olive pit particles, and
  applying the infill mixture of components, a, b and c in a single-step on an installed artificial turf system comprising a plurality of turf fibers secured to a backing material,
  wherein within a period of time of one month or less, preferably 1 week or less, and more preferably 1 day or less the components a, b, and c separate into at least a stabilization layer, and a performance layer which forms over the stabilization layer,
  wherein the stabilization layer comprises the thermo-tumbler product olive pit particles, and the microporous zeolite particles, and
  wherein the performance layer comprises the rounded and thermally treated olive pit fragments and when used the particles of the at least one other biobased material.

According to some embodiments, sand may be used as part of the component b and may settle to become part of the stabilization layer, however, such embodiment is less preferred. Via the thermo-tumbling treatment, the olive pits and olive pit fragments obtain a rounded shape which is designed to protect the skin of the players from injury, improves the packing density of the infill, reduces undesired water splashing in rainy conditions, and minimizes infill migration into the environment. In addition, the rounded and thermally treated olive pit material has no residual olive odor, has antimicrobial resistance, and enhanced surface hardness.

The thermo-tumbler product may be used directly or after subsequent post-processing removal of the olive pit particles as artificial turf infill.

The thermo-tumbler product comprises olive pit particles (dust-like particles generated by abrasion). According to some embodiments, the method of preparing the infill, further comprises a sieving operation of the thermo-tumbler product to reduce the amount of the olive pit particles having a size of less than 63 μm to an amount of 2.0% or less of the thermo-tumbler product, in particular to an amount of 1.0 to 2.0% by weight of the thermo-tumbler product. Keeping this level of olive pit particles has been found to be beneficial because the olive pit particles allow for a higher packing density of the infill. According to some embodiments, further sieving is possible to reduce the amount of olive pit particles to less than 1.0 wt %.

The removed olive pit particles from the thermo-tumbler product can be used as infill for a stabilization layer either alone or together with sand and/or zeolite, preferably with zeolite only.

When zeolite and/or sand are used, they are also preferably added in the thermo-tumbler to increase the abrasive effect/rounding effect of the thermo-tumbler treatment step.

According to some embodiments, a sand, zeolite, and rounded olive pit fragment mixture is used in particular as the stabilization layer. The zeolite has the additional advantage of cooling the artificial turf. In another embodiment, a zeolite and rounded olive pit fragment mixture is used in particular as the stabilization layer.

According to some embodiments, the method of creating an artificial turf comprises installing an artificial turf, and applying the artificial turf infill on the artificial turf. The infill comprises at least a mixture of the rounded (or rounded and thermally treated) olive pit fragments and of the olive pit particles, whereby the application is performed in a single step. The method further comprises allowing the olive pit particles in the applied infill to automatically trickle down into the voids between the fragments, thereby automatically forming a stabilization layer consisting essentially of the trickled-down particles, and a performance layer containing the rounded olive pit fragments. The infill mixture may further include zeolite which may also settle and become art of the stabilization layer. The infill mixture may also comprise at least one other bio-based material which can form the performance layer. It has been found, rather unexpectedly, that the tumbling treatment of the olive pit fragments helps this segregation and trickle-down effect, possibly because in addition to the large difference in the relative size of the fragments and the particles their enhanced round shape obtained by the tumbling helps the movement of the small size particles through the much larger fragments.

Referring now to FIG. 1, an artificial turf 10 is provided which comprises an infill 12 comprised of rounded olive pit fragments 24 obtained by a tumbling treatment of olive pit fragments in a tumbler 21. The infill 12 further contains olive pit particles 26 also obtained from the tumbling process. The olive pit particles 26 are smaller in size than the rounded olive pit fragments 24. The olive pit particles 26 have a size of less than 63 μm. In the illustrated embodiment, the olive pit particles 26 may be in an amount of 0.5 wt % to 2.0 wt % and the rounded olive pit fragments 24 may be in an amount of 98.0 wt % or greater of the total olive pit material. The olive pit particles 26 may eventually settle to a lower part of the infill 12. In FIG. 1, an enlarged image of the rounded olive pit fragments 24 is shown from a section of the infill. More images of the olive pit infill in different magnifications are shown in FIGS. 6A to 6E. In some embodiments, the tumbler 21 may be a thermo-tumbler, i.e., may also be heated to thermally treat the olive pit fragments 24.

Figure 2A:
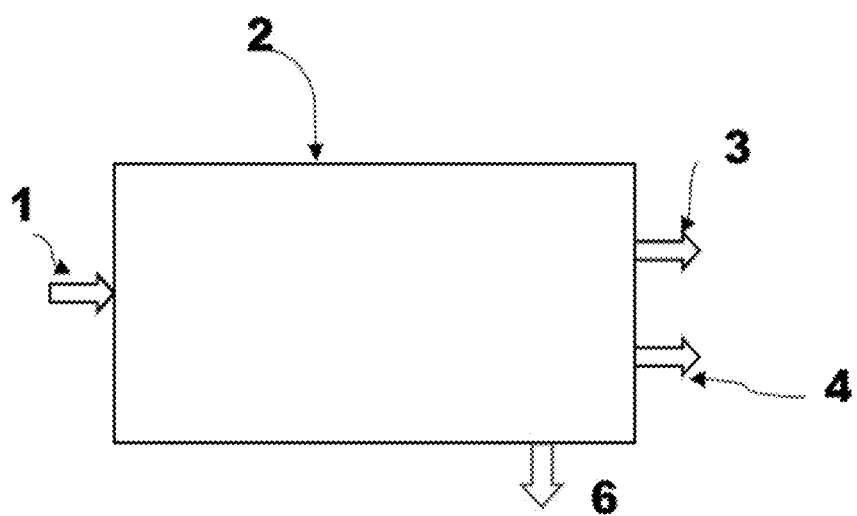
FIG. 2A is a simplified schematic of an olive extraction process according to some embodiments of the present invention.

Referring now to FIG. 2A, the olive pit fragments 6 are formed in an olive oil extraction process 2, for example, during a compression operation of olives 1 for the extraction of the olive oil 3 from the olives. Olive oil extraction processes using compression of the olives are well known and, therefore, are not described here in detail. It should also be understood that the olive pit fragments 6 may contain some whole pits, i.e., non-fractured pits.

Figure 2B:
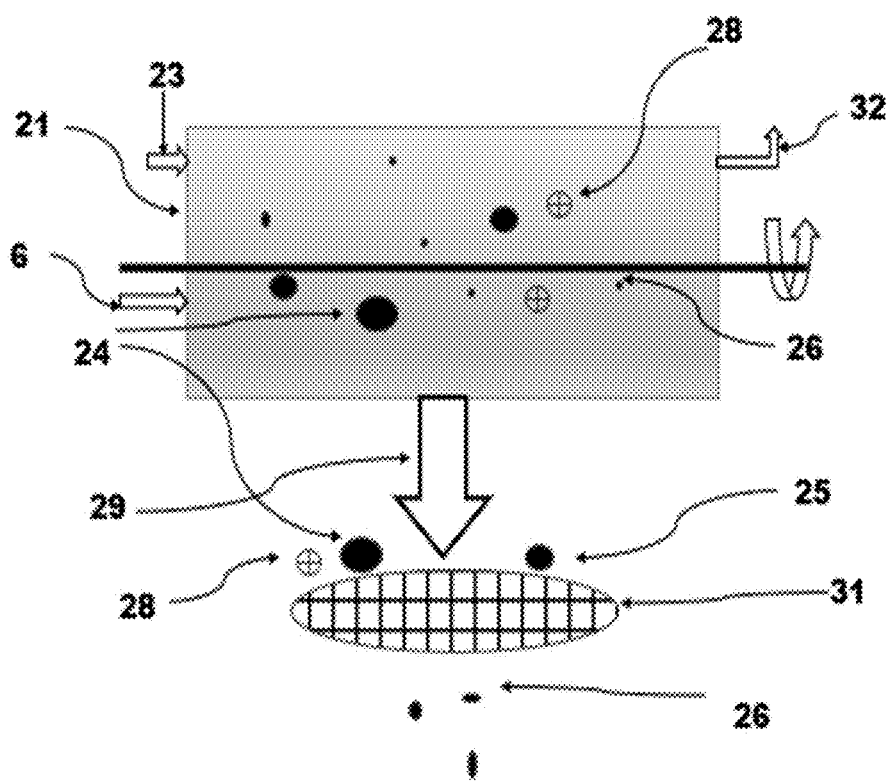
FIG. 2B is a simplified schematic of a thermo-tumbling process according to some embodiments of the present invention followed by a sieving operation.

As illustrated in FIG. 2A, according to an embodiment, the olive pit fragments 6 are separated from the other products, i.e., the extracted olive oil 3, and the olive pulp and skin 4. As shown in FIG. 2B, the olive pit fragments 6 are fed to a thermo-tumbler 21 to be subjected to a thermo-tumbling treatment.

In a preferred embodiment, the infill 12 of FIG. 1 consists of a single layer of infill formed of only rounded and thermally treated olive pit fragments 24 and olive pit particles 26 from the thermo-tumbling process, without any rubber-based infill, or polymer-based infill and, more preferably, without any non-bio-based material including any sand.

In a variation of the embodiment of FIG. 1, the olive pit particles 26 in the infill 12 may be reduced or totally removed by subjecting the thermo-tumbler product 29 to at least one sieving operation to remove some or all of the olive pit particles 26. The artificial turf 10 comprises a plurality of the artificial turf fibers 16 securely attached to the backing 11. The fibers 16 may be texturized with a non-straight shape such as curly, wavy, or folded shape. The texturization can be produced mechanically or chemically using well-known methods during the fiber manufacturing. The artificial turf fibers may have a density (number of fibers per artificial turf area) and/or degree of texturization that under a bird's eye perspective, at least 60%, more preferentially at least 70% of the size of the area covered by the artificial turf consists of the fibers and the rest consists of the carrier mesh or the backing or the infill.

The turf fibers 16 may be made of synthetic polymer material such as, for example, polyethylene ("PE"), polypropylene ("PP"), polyamide ("PA"), or combinations thereof. The fibers 16 may be mono filament, slit film, fibrillated, texturized, or combinations thereof. The backing 11 may be made of any suitable material. For example, the backing 11 may comprise a thermoset polymer material. According to some embodiments, the backing 11 may comprise a polyurethane resin. However, it is noted that the invention is not limited in any particular turf fiber or backing materials and other suitable turf fiber and backing materials may be used.

The pile height of the artificial turf may vary by design and may be, for example, between about 10.0 mm to about 100.0 mm, preferably between 15.0 mm to 70.0 mm. The pile height is the distance measured from the bottom surface of the turf backing 11 to the tip of the fibers 16. The fibers 16 can be attached to the turf backing 11 by any suitable method including, for example, tufting, weaving, knitting, needle punching, or a combination thereof.

The height of the infill 12 may vary by design and also the pile height. A typical infill height is from about 10.0 mm to 50.0 mm. The infill height is designed to provide adequate weight of the infill per square area of the infill to prevent movement and wrinkles on the artificial turf surface.

Referring to FIG. 2B, according to an embodiment, the thermo-tumbling treatment of the olive pit fragments 24 comprises placing them inside a rotating thermo-tumbler 21 and tumbling them while at the same time flowing hot air through the thermo-tumbler 21 to obtain a mixture of rounded and thermally treated olive pit fragments, and olive pit particles. The olive pit articles may also be referred to as olive pit dust and are basically created in the thermo-tumbler through the abrasion of the sharp edges of the fragments. The intensity and duration of the tumbling can be adjusted to avoid excessive formation of olive pit particles 26. Typically, the intensity, and duration of the tumbling are controlled to keep the amount of olive pit particles to at least 0.5 wt %, in particular 1.0 wt % to 20.0 wt %, more in particular 1.0 wt % to 10.0 wt %, and most in particular 1.0 wt % to 2.0 wt % of the total olive pit material.

According to some embodiments, hot air, steam or superheated steam may be used for thermally treating the olive pit fragments. The olive pit particles are olive pit fragments of less than 63 μm. The thermo-tumbling treatment may be a batch or a continuous process. Preferably, the thermo-tumbling treatment is a continuous process. Any suitable thermo-tumbling apparatus may be used.

Although, in some embodiments, the tumbling and the thermal treatment in the described embodiments are performed simultaneously and in the same apparatus, it is to be understood, that this is just an example of a preferred embodiment and that these treatments could also be performed separately without departing from the scope of the present invention.

According to some embodiments, following the treatment in the thermo-tumbler 21, the thermo-tumbler product 29 is sieved via a sieve 31 to remove the thermo-tumbler product olive pit particles 26. The rounded and thermally treated olive pit fragments 24 are used as infill for an artificial turf. The removed olive pit particles may be used for a stabilization layer of the infill. The rounded and thermally treated olive pit fragments 24 are used for the performance layer of the infill. For example, referring to FIG. 3, the rounded and thermally treated olive pit fragments 24 free of the olive pit particles 26 can be used in a performance layer 38 for an artificial turf 30 either alone or together with a second bio-based material, such as, for example, cork particles and/or cherry pits 25. When a second bio-based material such as the cork particles and/or the cherry pits 25 are used in the infill, they are preferably added in the thermo-tumbler 21 together with the olive pit fragments. In some embodiments, zeolite in the form of microporous zeolite particles is also added in the thermo-tumbler 21. As shown in FIG. 2B, the rounded and thermally treated olive pit fragments, when used the second bio-based material fragments 25 and the microporous zeolite particles can be separated from the olive pit particles 26 using the sieve 31. The use of cherry pits may further improve the infill shock absorption and force reduction.

The use of the cork particles and/or cherry pits 25 as a second bio-based material is advantageous because they may allow better packing of the infill and better customization of the overall elasticity of the infill (i.e., the mixture of olive pit fragments cork particles and/or cherry pits) by adjusting the weight ratio of each of the rounded and thermally treated olive pit fragments and of the at least one other bio-based material in the infill to obtain the desired overall elasticity for the infill. The cork particles and/or the cherry pits may be subjected to the same thermo-tumbling process as the olive pit fragments by adding them into the thermo-tumbler 21. The cherry pits may be whole pits or fragmented pits before fed into the thermo-tumbler 21. The cherry pits may be the remnants of cherry pit commercial processes for making cherry juice, and the like. In a preferred embodiment, the olive pit fragments 24 and the cherry pits 25 are mixed together within the thermo-tumbler 21 which may further enhance the rounding of the olive pit fragments 24.

Figure 3:
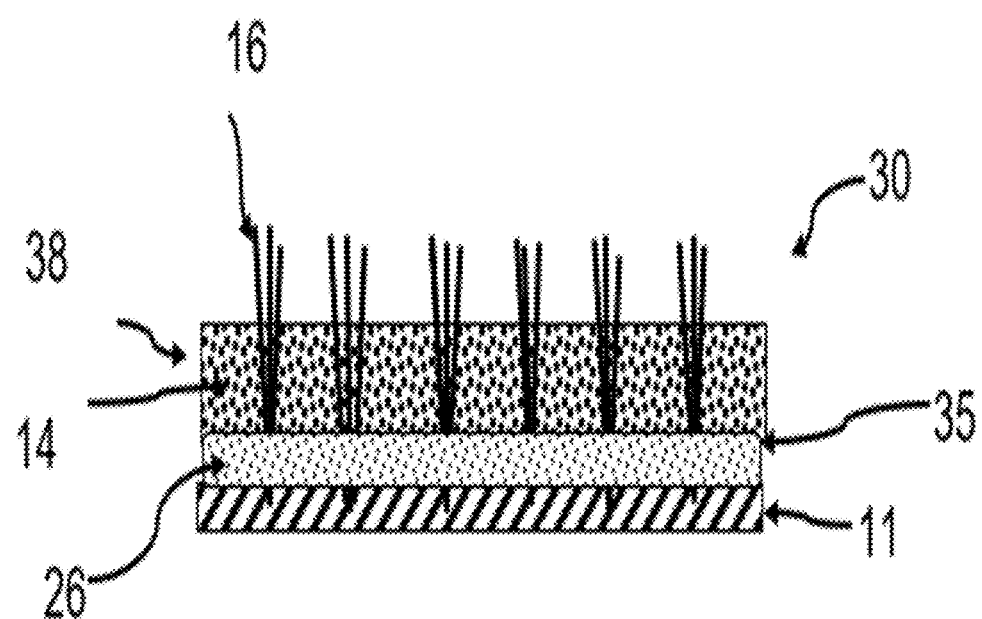
FIG. 3 shows a further embodiment of an artificial turf with an infill comprising a stabilization layer and a performance layer.

According to the embodiment of FIG. 3, the separated olive pit particles 26 using a sieving process (see FIG. 2B) are used as infill for a stabilization layer 35 preferably alone or together with any particles (of less than 63 µm size) of another bio-based material, while the rounded and thermally treated olive pit fragments 24 free of the olive pit particles 26 are used to form the performance layer 38 either alone or together with a second bio-based material fragments (of a size of 0.5 mm or greater) such as, cork particles and cherry pits 25. According to this embodiment, the artificial turf 30 comprises the stabilization layer 35 formed on the baking 11 of the artificial turf 30 exclusively with the olive pit olive pit particles or in a mixture with a second stabilizing bio-based material, and the performance layer 38 formed on the stabilization layer 35 formed exclusively with the rounded and thermally treated olive pit fragments 24 or with a mixture of the rounded and thermally treated olive pit fragments 24 and a second bio-based material particles, such as, preferably the cork particles and/or the cherry pit particles. Preferably, the performance layer 38 comprises the rounded olive pit fragments 24 and second bio-based material of the cork fragments and/or cherry pit fragments 25 in a mixture prepared, for example, in the thermo-tumbler 21 and sieving the thermo-tumbler product to separate the olive pit particles 26 which are used for forming the stabilization layer 35. The stabilization layer 35 may optionally include sand which is currently widely used in state of the art infills, however, the present invention allows completely eliminating the need for using sand in the stabilization layer. Eliminating the sand is advantageous because it is non-bio-based material and creates problems in the shredders used in the recycling of the artificial turf at the end of the useful life of the artificial turf.

According to some embodiments, microporous zeolite particles may be added in the infill for providing a cooling effect for the artificial turf. Optionally particles of a reflective material may also be added. The grain size of the microporous zeolite particles is determined such that the resulting specific surface area of the particles is smaller than a maximum specific surface area. The maximum specific surface area of the microporous zeolite particles is the specific surface area that enables the water in the particles to release, under an ambient temperature, at a predefined minimum rate. A progressive release of the water by the microporous zeolite particles and avoidance of rapid evaporation of the water after the surface has been watered is desirable in order to allow a lower temperature to be maintained at the level of the field surface compared to the ambient temperature. In other words, the controlled release of absorbed water causes progressive cooling under evaporation for some time. Thus, the amount of watering usually necessary to refresh a field surface can be reduced.

The grain structure of the microporous zeolite particles enables the formation of bound water surrounding particles surfaces and maintained by weak force of van der Waals force. This renders the release or desorption of the water easier in particular under ambient temperature (e.g., the solar energy is enough to desorb the water). Naturally, the specific surface area of the microporous zeolite particles varies with its structure. For example, the finer the particles are, the larger the specific surface area is (i.e., the smaller the grain size is, the larger the specific surface area is). For example, the specific surface area of the microporous zeolite particles may not exceed a minimum specific surface area. The minimum specific surface area may be the smallest possible specific surface area. In this case, the determined grain size may be the lower limit of a range of sizes, wherein the upper limit of the range may be determined using the minimum specific surface area. The microporous zeolite particles may for example have a grain size between 0.1 mm and 1.5 mm, in particular between 0.4 mm to 1.2 mm, more in particular between 0.9 mm and 1.2 mm, and a maximum surface specific surface area of 21 $m^2/g$. For example, a selected specific surface area may be 20 $m^2/g$.

According to some embodiments, the artificial turf infill comprises microporous zeolite particles having a selected grain size smaller than 1.5 mm and a porosity between 15% and 20%. In an embodiment, the microporous zeolite particles may have a grain size distribution wherein 70% to 90% of the grains by weight have a size in the range of 0.4 mm to 1.5 mm and 10.0% to 30% of the grains by weight have a size smaller than 0.4 mm.

According to some embodiments, 0.6 wt % of the zeolite particles at most is not retainable on a 10-mesh screen. Preferably, the microporous zeolite particles have a hardness between 3.5 to 5.5 on the Mohs scale. Preferably, the moisture level in the microporous zeolite particles is smaller than 6 wt % as measured by the wet method, i.e., based on the total weight of the zeolite solids and moisture.

The microporous zeolite particles allow a lower temperature to be maintained at the level of the field surface compared to the ambient temperature by the controlled release of water via evaporation. Thus, the amount of watering usually necessary to refresh a field surface may be reduced.

According to some embodiments, the mixture of rounded and thermally treated olive pit fragments obtained from the thermo-tumbler is not sieved at all and is applied as obtained from the thermo-tumbler once the thermo-tumbling treatment is completed, on the backing of the artificial turf. It has been found that in a relative short time, the olive pit particles and the fragments separate with the olive pit particles settling at the bottom of the infill layer forming a stabilization layer and the larger rounded and thermally treated olive pit fragments form a performance layer over the stabilization layer with the olive pit particles. It should be understood that the transition from the olive pit particles layer to the rounded and thermally treated olive pit fragments layer may be gradual and that there may be an intermediate layer between the olive pit particles layer and the rounded olive pit particles comprising the two different particle size groups. In some embodiments, a zeolite and optionally sand, preferably zeolite only may also be added.

Hence, according to some embodiments, the following mixture is generated and applied on the artificial turf:
a) rounded and thermally treated olive pit fragments 24,
b) zeolite 28 (medium sized) (sand may also be added in the component b as optional material) and
c) olive pit particles 26.

Figure 4A:
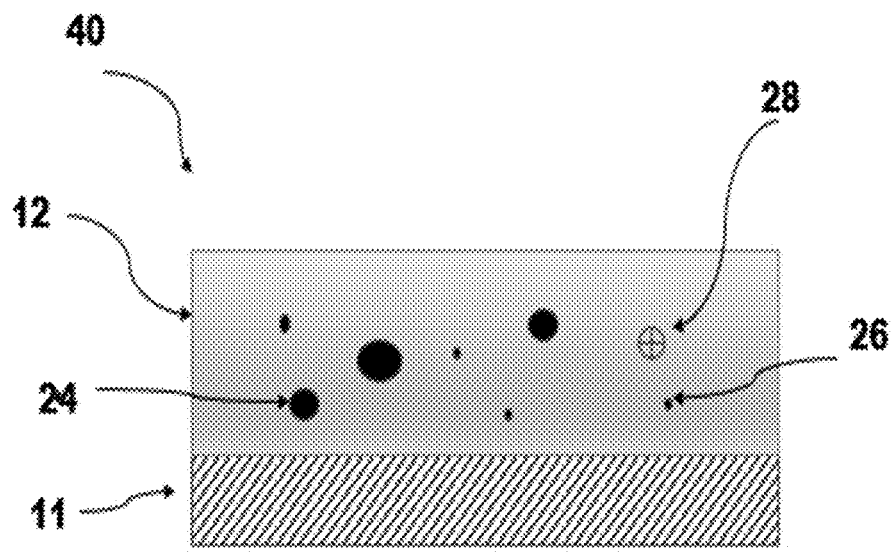
FIGS. 4A and 4B illustrate a single step application of an infill mixture on the artificial turf and its subsequent self-segregation into a stabilizing and a performance layer.
Figure 4B:
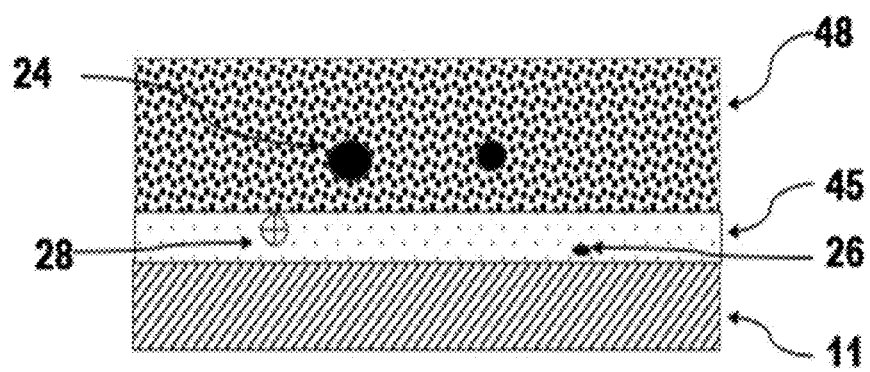

Referring to FIG. 4, after having applied the whole mixture including the components a, b, and c on the artificial turf, the components a, b and c will automatically separate into different stabilizing and performance layers 45 and 48, respectively, with the olive pit particles 26 moving downward next to the carrier/backing 11 of the artificial turf because of their small particle size which makes them fall down filling the cavities between the larger objects and eventually make it all the way down shifting the larger particles upwards. It is noted that the artificial turf fibers are not shown in FIG. 3 for simplicity of presentation. Also, the various components are presented in a simplified schematic manner and not according to their actual shapes, and sizes.

This embodiment, (with or without the component 'b') is advantageous because the mixture is applied on the carrier or backing 11 of the artificial turf 40 in a single step and within a short period of use it separates by itself in a stabilization layer 45 comprising primarily olive pit particles 26 and when used the microporous zeolite particles 28, and a performance layer 45 comprising primarily of the rounded and thermally treated olive pit fragments 24.

The microporous zeolite particles 28 of the component b, when used, they separate also with the main bulk of it settling primarily within the stabilization layer 45. The microporous zeolite particles 28 provide a cooling effect in the infill of the artificial turf 40 and can also help the artificial turf stay drier in a rainy day because of their ability to soak water (through absorption) due to their microporous structure. The result is an artificial turf with less variable performance characteristic between warm, sunny days and cooler rainy days. Thus, the proposed infill comprising components a, b and c is advantageous because:
1) it is made through a simplified manufacturing mixing process,
2) it is applied through a "single-step" application on the backing of the artificial turf,
3) it self-separates into a stabilization layer and a performance layer, and
4) it reduces performance variability in different weather conditions.

Thus, unlike many state of the art artificial turf types which require separate formation of a stabilization layer and a performance layer, according to a preferred embodiment of the present invention these layers are formed automatically by a single-step application of the above-mentioned mixture comprising only components 'a' and 'c,' or a mixture comprising 'a', 'b' and 'c' and self-separation into the stabilizing and performance layers based on object size and specific gravity will achieve at least similar mechanical properties like a conventional two-layer artificial turf system with a stabilizing and performance layer. The infill mixture may include at least one other bio-based material such as cork particles and/or cherry pits 25 which after an initial settling period form part of the performance layer 48.

The infill of the present invention may comprise thermally treated bio-based materials including rounded olive pit fragments. The infill exhibits excellent antimicrobial resistance, and attrition resistance. It also has no remaining olive odor or other odors from any additional bio-based materials used. Finally, because of the rounded larger size fragments obtained by the thermo-tumbling process the infill is less likely to cause any skin injuries or foot injuries to the users of the artificial turf.

The infill may further include any other suitable components such as an antimicrobial agent used for preventing the growth of bacteria, fungi, mold, or other microorganisms. Any suitable antimicrobial agent may be used and, according to some embodiments, the antimicrobial agent may also be added in the turf backing and/or turf fibers.

The artificial turf may further include other components such as a reflective agent. The reflective agent may be added in the infill and/or in the polymer mixture for making the artificial turf fibers 16, for further preventing overheating of the fiber in warm and sunny conditions. The reflective agent may reduce the heat on the artificial turf field. Suitable reflective agents include titanium dioxide, zinc sulfide, tin oxide, aluminum oxide, zinc oxide, calcium sulfate, barium sulfate, calcium carbonate, antimony oxide, sodium silicate, aluminum silicate, silica, mica, clay, and the like.

In a preferred embodiment an infrared (IR) reflective agent is a mixed metal oxide type chosen from the group of the rutile (MeO2), hematite (Me2O3), or spinel (Me3O4) type with metals comprising cobalt, iron, trivalent chrome, tin, antimony, titanium, manganese and aluminum. For example, the reflective agent may be used in an amount from 0.01 wt % to 8.0 wt %, in particular from 0.3 wt % to 5.0 wt %, more in particular from 0.3 wt % to 3.0 wt % based on the total fiber weight.

Figure 5A:
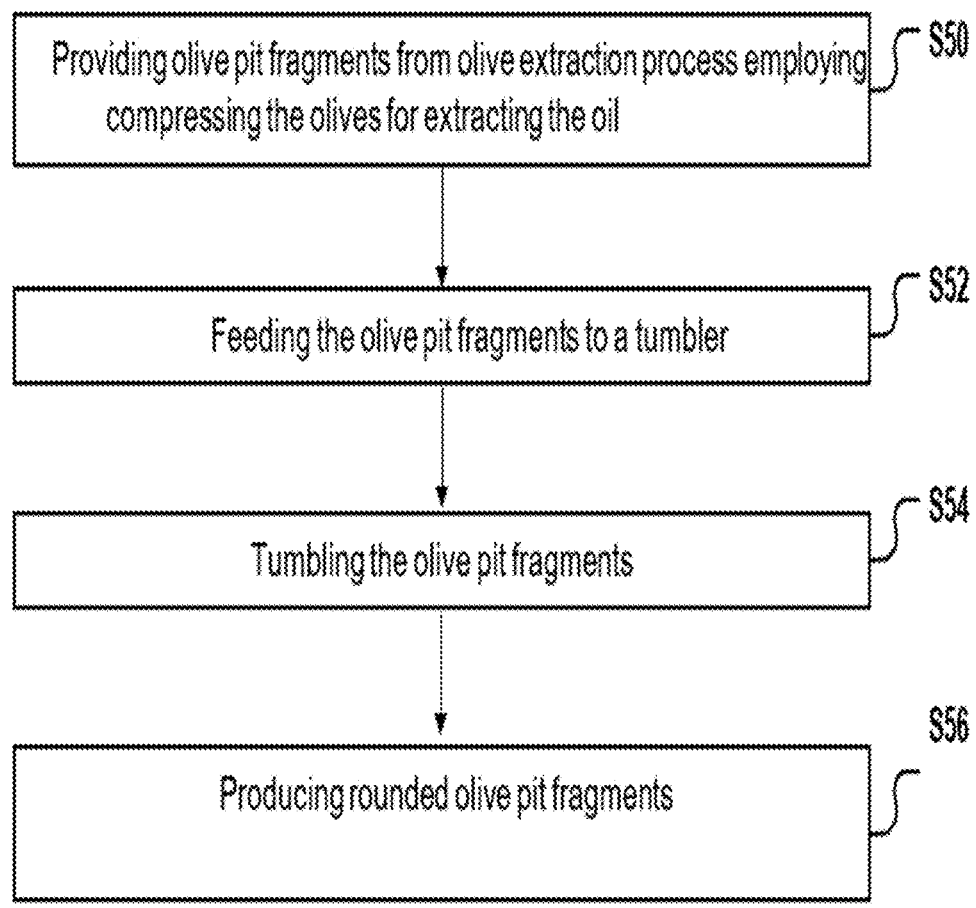
FIGS. 5A and 5B are simplified flow charts of methods of making an infill according to some embodiments of the present invention.

Referring to FIG. 5A, a method of fabricating an infill for an artificial turf is provided, the method comprising, providing olive pit fragments separated from an olive extraction process compressing olives to extract olive oil from the olives (S51), feeding the olive pit fragments in a tumbler (S53), tumbling the olive pit fragments (S55), and producing rounded olive pit fragments including olive pit particles (S57).

Figure 5B:
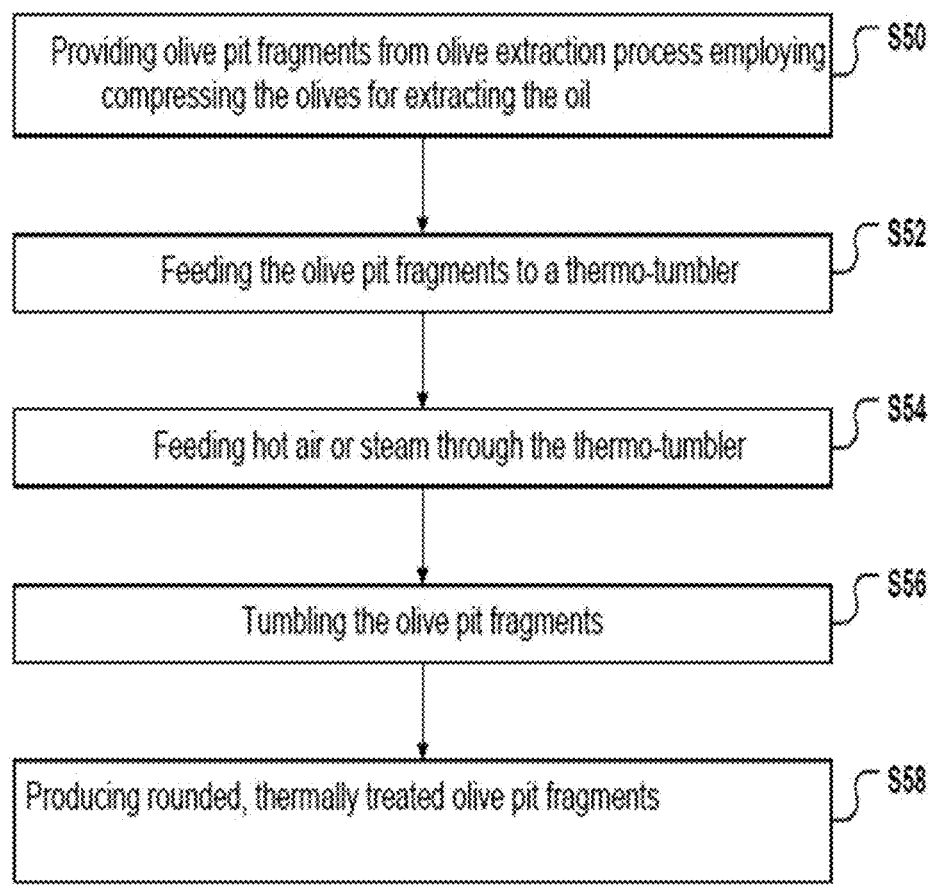
Figure 6A:
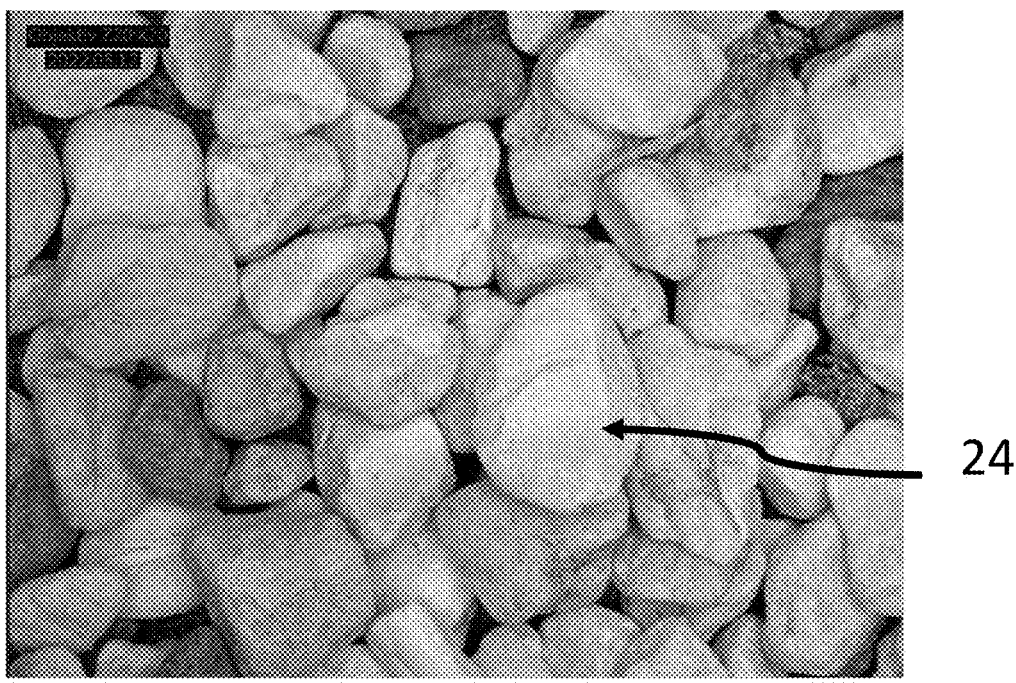
FIGS. 6A to 6E show rounded and thermally treated olive pit fragments produced by the thermo-tumbling process at different magnifications in an infill layer formation.
Figure 6B:
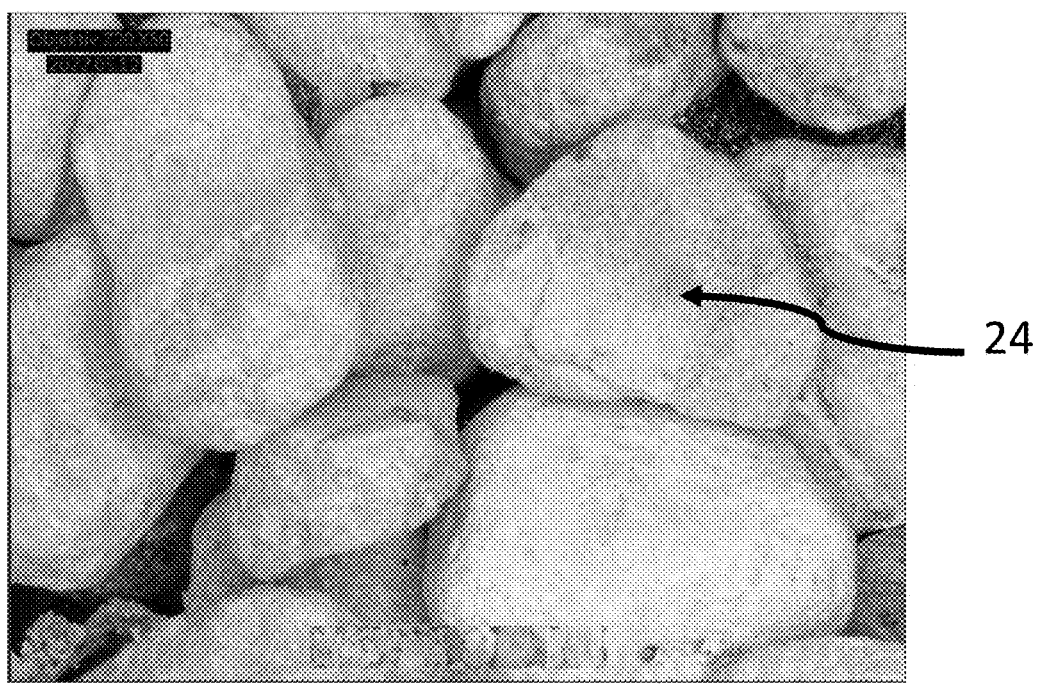
Figure 6C:
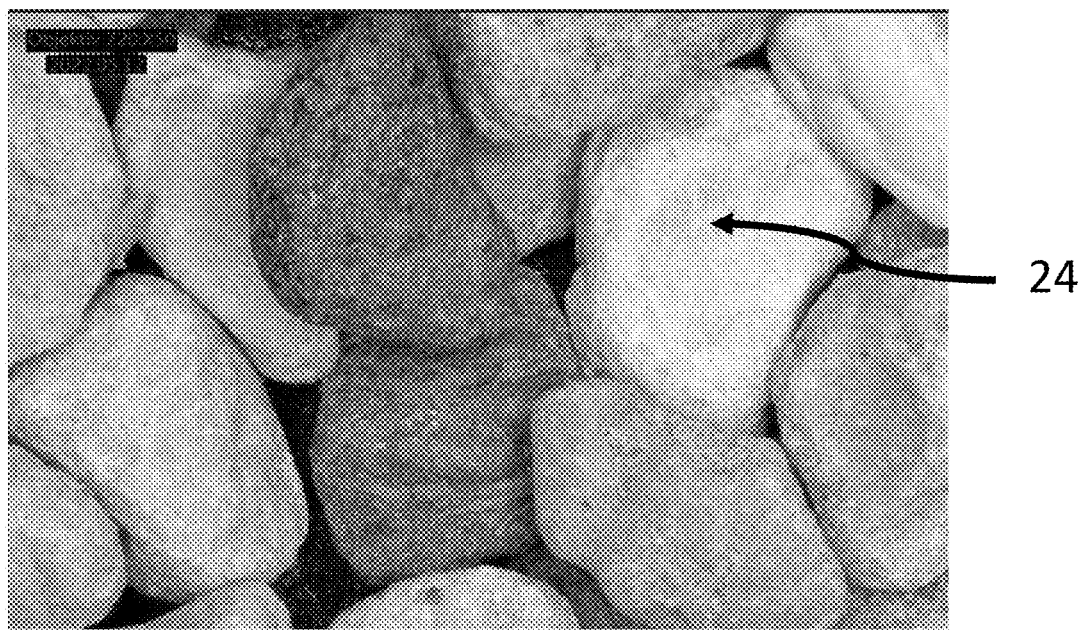
Figure 6D:
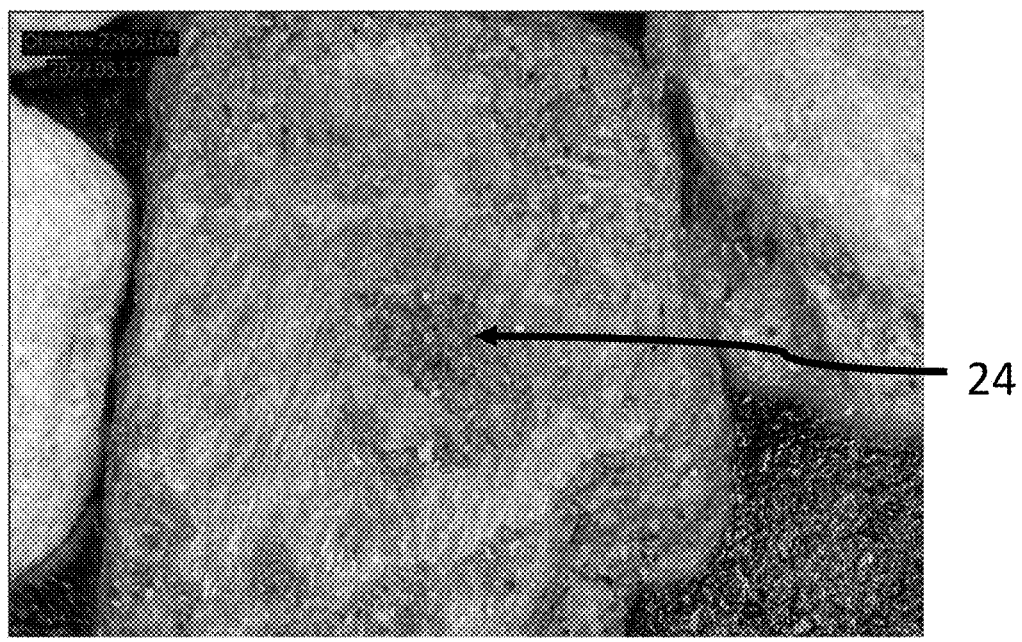
Figure 6E:
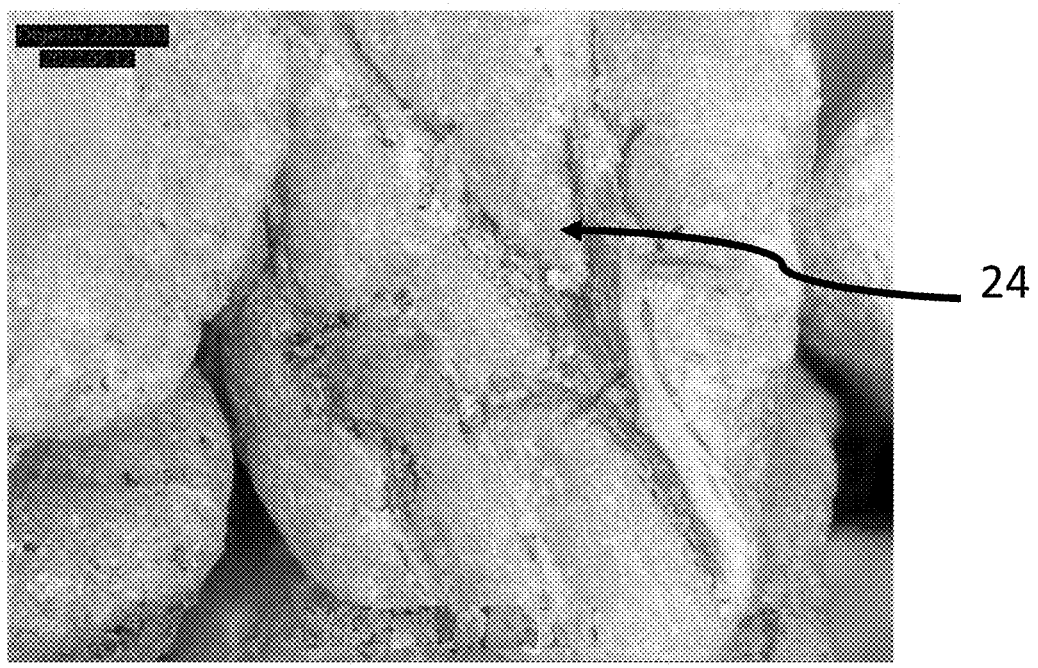

In some embodiments, the olive pit fragments may also be subjected to a thermal treatment. Referring to FIG. 5B, the method of fabricating an infill for an artificial turf is provided, the method comprising, providing olive pit fragments separated from an olive extraction process compressing olives to extract olive oil from the olives (S50), feeding the olive pit fragments in a thermo-tumbler (S52), feeding hot air, steam or superheated steam through the thermo-tumbler (S54), tumbling the olive pit fragments (S56), and producing rounded and thermally treated olive pit fragments including olive pit particles (S58).

According to some embodiments, the rounded and or the rounded and thermally treated olive pit fragments including the olive pit particles are used to form an infill for an artificial turf.

According to some embodiments, the olive pit particles are separated from the thermo-tumbler product using sieving to remove all olive pit particles having a size of less than 63 µm.

According to some embodiments, cherry pits whole, fragments, or mixtures thereof are also fed in the thermo-tumbler and are mixed together with the olive pit fragments.

According to some embodiments, in addition to the olive pit fragments (with or without the cherry pits), at least one of sand, and zeolite are added as a second component in the thermo-tumbler and mixed together with the olive pit fragments an/or the cherry pits.

In a preferred embodiment, the product from the thermo-tumbler includes rounded and thermally treated olive pit fragments and/or cherry pits (component a, bio-based material), at least one of sand and zeolite, preferably zeolite only or zeolite and sand (component b) and the olive pit particles (component c), and this mixture of components a, b and c is applied in a single-step on the backing of the artificial turf, wherein within a short period of time separate into at least a stabilization layer which forms over the backing, and a performance layer which forms adjacent the stabilization layer. The stabilization layer comprises the olive pit particles and the sand when sand is used as at least one part of the component b. The performance layer includes the larger size bio-based material, i.e., the rounded olive fragments and when used also the cherry pits and when used also the zeolite particles. It should be understood that the thermo-tumbler process may also generate olive pit particles not only from the olive pits but also from the other components when used, i.e., the cherry pits, and the zeolites, and all these olive pit particles will settle at to form the stabilization layer, together with the most part or all of the sand used.

Typically, incorporating the turf fiber into the carrier includes positioning the fiber so that a first fraction of the fiber is located at the back side of a carrier, a second fraction of the fiber is protruding to the front side of the carrier and a third fraction of the fiber is inside the carrier (referred to also as the middle fraction of the fiber or the carrier portion of the fiber).

According to some embodiments, the artificial turf fibers are integrated into the backing and have a density (number of fibers per artificial turf area) and/or degree of texturization that under a bird's eye perspective, at least 60%, preferably at least 70% of the size of the area covered by the artificial turf consists of the fibers and the rest consists of the backing or the infill.

The backing of the artificial turf is made of a thermoset polymer material, however, the invention is not limited in this way and other suitable backing materials may be used. The thermoset material may include, for example, a polyurethane resin.

The term "tufting" as used herein refers to a method of incorporating a fiber into an existing carrier. Short U-shaped loops of fibers are introduced through the carrier from one side so that their ends point outside of the carrier in the other direction. Usually, the tuft yarns form a regular array of "dots" on the other side. On the one side of the carrier where the U-shaped loops are located, the tuft fibers may be tied for security, although they need not be. The ends of the tuft yarns can then optionally be frayed or otherwise processed, so that they will subsequently create a dense layer of fibers protruding from the carrier.

The term "weaving" as used herein is a method of incorporating an artificial turf fiber (which can be a monofilament or a bundle of monofilaments) into an existing carrier, whereby the artificial turf fiber and the fiber(s) that built the carrier are interlaced. The interlaced fibers and the mesh form a fabric like or cloth like structure. When an artificial tuft fiber is incorporated by weaving, the fiber interlaces a series of mesh fibers at least three times. Thus, when a fiber is incorporated by weaving rather than tufting, a higher fraction of the artificial turf fiber is interlaced in the carrier material. This may increase the resistance to wear and tear of the artificial turf.

According to some embodiments, incorporating the artificial turf fiber into the carrier comprises tufting the artificial turf fiber into the carrier. According to alternative embodiments, incorporating the artificial turf fiber into the carrier comprises weaving the artificial turf fiber into the carrier.

The formation of the artificial turf may be made using any suitable manufacturing process. For example, a polymer mixture comprising at least one polymer such as a polyethylene, and various additives including, for example, a friction control additive, a reflective agent, an antioxidant, a coloring agent and the like is made by putting all these components that make it up together and is thoroughly mixed in a mixer device. The desired distribution of the components can be achieved by using the proper rate or amount of mixing. The generated mixture is then forwarded to a one-screw feed or a two-screw feed to be extruded into a monofilament. The monofilament is quenched or rapidly cooled down, then reheated and oriented by stretching it into an artificial turf fiber is bundled with additional monofilaments into an artificial turf fiber.

Next the artificial turf fiber is incorporated into an artificial turf backing. The incorporation may comprise arranging a plurality of the artificial turf fibers on a carrier so that first parts of the monofilaments are exposed to a bottom side of the carrier and second parts of said monofilaments are exposed to a top side of the carrier. The arranging could be accomplished by tufting or weaving the artificial turf fiber into the carrier, but other methods of arranging the fibers within the carrier are also possible. Then a resin reaction fluid mixture is added on the bottom side of the carrier such that least the first parts become embedded in the fluid. Finally, the fluid mixture is caused to solidify into a film and surround and thereby mechanically fix the fibers on the backing.

EXAMPLES

Examples 1

FIGS. 6A to 6E are images at different magnifications of an infill layer formed of rounded and thermally treated olive pit material comprising rounded and thermally treated olive pit fragments having a size of 0.5 to 2.0 mm in an amount of 99.0 wt % of the total olive pit material, and olive pit particles of a size of less than 63 μm in an amount of 1 wt % of the total olive pit material. The olive material is obtained after a thermo-tumbling simultaneous treatment in a thermo-tumbler of olive pit fragments from an olive extraction process for a period of 2.7 minutes at a temperature of 120° C. These images show that the thermo-tumbling treatment smoothens the rough edges of the olive pit fragments and provides more rounded olive pit fragments without sharp edges. Moreover, the infill is free of any remaining olive odor, and is less likely to cause skin or foot injuries to the users of the artificial turf compared to an artificial turf using the untreated olive pit fragments. The olive pit material is applied in a single step over the thermoset polyurethane backing of an artificial turf comprising turf fibers of polyethylene having a pile height of 70 mm to form an infill having a height of 30 mm. The artificial turf made with the infill of the thermo-tumbled olive pit material shows a substantially improved balance of traction, energy absorption, stable foot and energy restitution characteristics compared to same artificial turf made with the untreated olive pit material. Untreated olive pit material refers to the olive pit material prior to the thermo-tumbling process.

Example 2

The same processes as in Example 1 are repeated except that microporous zeolite particles are added in an amount of 10.0 wt % of the total infill. The microporous zeolite particles have a grain size distribution wherein 80.0 wt % of the grains have a size in the range of 0.4 mm to 1.5 mm and 20 wt % of the grains have a size smaller than 0.4 mm. The infill mixture of the olive pit material and the microporous zeolite particles are processed together in the thermo-tumbler under the same conditions as in example 1 and the thermo-tumbler product without any sieving is applied on the thermoset polyurethane backing as in example 1. The infills of Examples 1 and 2 are watered and their temperatures are measured at a center point of the infills under the same ambient temperatures 2 and 4 hours later after the watering of the infill whereas the infill of example 2 demonstrates consistently lower temperature than Example 1.

Examples 3, 4 and 5

An olive pit material is obtained after a thermo-tumbling simultaneous treatment in a thermo-tumbler of olive pit fragments from an olive extraction process as in Example 1 except for a period of 60 minutes, and that the olive pit material is heated to a temperature of 160° C. (for Example 3), 180° C. (for example 4) and 200° C. (for example 5). The olive pit materials from Examples 3-5 are substantially free of any sharp edges and any remaining olive odor and like the olive pit material of Example 1 are less likely to cause skin or foot injuries to the users of the artificial turf compared to an artificial turf using the untreated olive pit material.

In addition, the olive pit materials of examples 3-5, compared to the olive pit material of Example 1, exhibit substantially improved antimicrobial resistance, enhanced abrasion resistance, and reduced hygroscopicity. The olive pit material of example 3 has significantly reduced hygroscopicity when compared to the olive pit material of example 1 while the olive pit materials of examples 4 and 5 exhibit almost no hygroscopicity at all. Because of the aforementioned significantly improved characteristics and in particular the reduced hygroscopicity, the olive pit material of example 3 is expected to exhibit significantly improved resistance to biodegradability and prolonged lifespan compared to the olive pit material of Example 1. Likewise, the olive pit materials of examples 4, and 5 because of their substantially zero hygroscopicity, are expected to exhibit exceptional resistance to biodegradation in moist and humid conditions making particularly suitable for artificial turfs used in applications where frequent watering is needed. XPS analysis shows that Examples 3, 4, 5 have substantially decreased O/C (oxygen to carbon) ratio compared to the O/C ratio of Example 1. NMR analysis showed that Examples 3, 4, 5 have substantially higher levels of crystalline cellulose measured at 89 ppm compared to the crystalline levels example 1. The olive pit materials are applied in a single step over the thermoset polyurethane backing of an artificial turf comprising turf fibers of polyethylene having a pile height of 70 mm to form an infill having a height of 30 mm. The artificial turf made with the infill of the thermo-tumbled olive pit material of Examples 3, 4, and 5 show a substantially improved balance of traction, energy absorption, stable foot and energy restitution characteristics compared to same artificial turf made with the untreated olive pit material.

Example 6, 7, and 8

Microporous zeolite particles are added in an amount of 10.0 wt % of the total infill which employs the olive pit materials from examples 3, 4, and 5, respectively. The microporous zeolite particles have a grain size distribution wherein 80.0 wt % of the grains have a size in the range of 0.4 mm to 1.5 mm and 20 wt % of the grains have a size smaller than 0.4 mm. The infill mixture of the olive pit material and the microporous zeolite particles are processed together in the thermo-tumbler under the same conditions as in Example 1 and the thermo-tumbler product without any sieving is applied on the thermoset polyurethane backing as in Example 1. The infills of 6, 7, and 8 are watered and their temperatures are measured at a center point of the infills under the same ambient temperatures 2 and 4 hours later after the watering of the infill whereas the infill of Examples 6, 7 and 8 demonstrate consistently lower temperatures than example 1.

Although the invention has been described in reference to specific embodiments, it should be understood that the invention is not limited to these examples only and that many variations of these embodiments may be readily envisioned by the skilled person after having read the present disclosure. The invention may thus further be described without limitation and by way of example only by the following embodiments. The following embodiments may contain preferred embodiments. Accordingly, the term "clause" as used therein may refer to such a "preferred embodiment".

Clause 1. A method of creating an artificial turf infill, the method comprising: providing olive pit fragments;

tumbling the olive pit fragments to produce rounded olive pit fragments; and using the mixture as the infill or a component of the infill.

Clause 2. The method of clause 1, wherein the tumbling is performed at an effective tumbling intensity and for an effective period of time to smoothen the sharp edges of the olive pit fragments and generate olive pit particles having a size less than 63 μm in an amount of at least 0.5 wt %, in particular 1.0 wt % to 20.0 wt %, more in particular 1.0 wt % to 10.0 wt %, and most in particular 1.0 wt % to 2.0 wt % of a total olive pit material generated by the tumbling.

Clause 3. The method of clause 2, wherein the rounded olive pit fragments have a size of 0.5 mm or greater, in particular 0.5 mm to 4.0 mm, more in particular 0.5 mm to 2.5 mm, and most in particular 0.5 mm to 2.0 mm, and wherein the rounded olive pit fragments are in an amount of at least 80.0 wt %, in particular 90.0 wt % to 99.0 wt %, more in particular 95.0 wt % to 99.0 wt %, and most in particular 98.0 wt % to 99.0 wt % of the total olive pit material generated by the tumbling.

Clause 4. The method of clauses 2 to 3, wherein the total olive pit material generated by the tumbling has a bimodal size distribution with a major mode and a minor mode, wherein the major mode comprises the rounded olive pit fragments and has a peak between 0.5 mm to 4.0 mm, more in particular between 0.5 mm to 2.5 mm, and more in particular between 0.5 mm to 2.0 mm, and wherein the minor mode comprises the olive pit particles and has a peak at less than 63 μm.

Clause 5. The method of clauses 1 to 4, further comprising thermally treating the olive pit fragments.

Clause 6. The method of clause 5, wherein the thermal treatment heats the olive pit fragments to a temperature of 80° C. to 130° C., in particular 100° C. to 130° C., and more in particular 110° C. to 130° C.

Clause 7. The method of clause 5, wherein the olive pit material is thermally treated at a temperature of 150° C. to 250° C., in particular 160° C. to 250° C., and more in particular 180° C. to 250° C.

Clause 8. The method of clauses 5-7, wherein the tumbling and the thermal treatment are performed simultaneously in a thermo-tumbler apparatus.

Clause 9. The method of clauses 5-8, wherein the thermal treatment includes feeding hot air, or steam in the thermo-tumbler apparatus.

Clause 10. The method of any of the preceding clauses, wherein the olive pit fragments are products of an olive oil press;

and/or wherein the rounded and thermally treated olive pit fragments are substantially free of sharp edges.

Clause 11. The method of any of the preceding clauses, further comprising mixing together with the olive pit fragments, or with the rounded olive pit fragments, or with the rounded and thermally treated olive pit fragments at least one other bio-based material including cork particles, and cherry pits whole, fragments, or mixtures thereof, and using the mixture as the infill or a component of the infill.

Clause 12. The method of any of the preceding clauses, wherein the infill comprises only bio-based materials and is free of any rubber, elastomeric, or polymer-based infill, and is preferably also free of any sand.

Clause 13. The method of any of the preceding clauses, further comprising mixing microporous zeolite particles together with the olive pit fragments, or with the rounded olive pit fragments or with the rounded and thermally treated olive pit fragments, and using the rounded olive pit fragments and the microporous zeolite particles as the infill or as components of the infill.

Clause 14. The method of any of the preceding clauses, wherein the method is free of a step which crushes or grinds the not-yet rounded olive pit fragments or the rounded olive-pit fragments.

Clause 15. The method of any of the preceding clauses, further comprising a sieving operation for reducing the amount of olive pit particles having a size of less than 63 μm to an amount of 2.0 wt % or less, in particular to an amount of 1.0 to 2.0% by weight of the totality of olive-pit material in the infill.

Clause 16. The method of clause 15, wherein the olive pit particles removed from the thermo-tumbler product are used as infill for a stabilization layer either alone or together with sand and zeolite, and preferably with zeolite only and no sand.

Clause 17. An artificial turf infill comprising rounded olive pit fragments.

Clause 18. The artificial infill of clause 17 manufactured in a method of any one of clauses 1-15.

Clause 19. A kit for manufacturing an artificial turf, the kit comprising the artificial infill of clauses 17 or 18 and at least one other component for making the artificial turf.

Clause 20. An artificial turf comprising a carrier, artificial turf fibers integrated in the carrier, and the artificial infill of any one of clauses 17 or 18.

Clause 21. Use of the artificial turf infill of any one of clauses 17 or 18 for forming at least one infill layer of an artificial turf.

Clause 22. A method of creating an artificial turf, comprising:

installing an artificial turf; and applying the artificial turf infill created in the method according to any one of the clauses 1-16 on a carrier of the installed artificial turf or on an existing infill layer.

Clause 23. The method of clause 22, wherein the infill comprises at least a mixture of the rounded olive pit fragments and of the olive pit particles, wherein the applying of the artificial turf infill is performed in a single step, and allowing the olive pit particles in the applied infill to segregate from the rounded olive pit fragments and automatically trickle down into the voids between the fragments.

Clause 24. The method of clauses 23, wherein the artificial turf has a two-layer structure comprising a stabilization layer and a performance layer on top of the stabilization layer, wherein at least one of the stabilization layer and the performance layer comprises microporous zeolite particles, and/or wherein the performance layer comprises the at least one other bio-based material.

25. A method of using an artificial turf comprising the artificial turf infill of any one of claim 17 or 18, the method comprising:

watering the artificial turf, wherein the microporous zeolite particles are adapted to store water in their pores during the watering and to release gradually through evaporation the stored water thus cooling the artificial turf.

LIST OF REFERENCE NUMERALS

1 olives
2 olive oil extraction process
3 olive oil
4 olive pulp and skin
6 olive pit fragments
10, 30, 40 artificial turf (AT)
11 backing or carrier of the AT
12 infill
24 rounded olive pit fragments or rounded and thermally treated olive pit fragments
35, 45 stabilization layer
38, 48 performance layer
26 olive pit particles
25 at least one other bio-based material
21 tumbler or thermo-tumbler
23 heated medium flowing in the thermo-tumbler
32 heated medium flowing out of the thermo-tumbler
28 microporous zeolite particles
29 tumbler product
31 sieve for olive pit particles

What is claimed is:

1. A method of creating an artificial turf infill, the method comprising:

providing olive pit fragments;

tumbling the olive pit fragments to produce an olive pit material comprising rounded olive pit fragments and olive pit particles; and using the olive pit material as the artificial turf infill or as a component of the artificial turf infill, wherein the tumbling is performed at an effective tumbling intensity and for an effective period of time to smoothen sharp edges of the olive pit fragments and generate a total olive pit material having a bimodal size distribution with a major mode and a minor mode, wherein the major mode comprises the rounded olive pit fragments and has a peak between 0.5 mm to 4.0 mm, and wherein the minor mode comprises the olive pit particles of a size less than 63 μm and has a peak at less than 63 μm.

2. The method of claim 1, wherein the olive pit particles are in an amount of at least 0.5 wt % of the total olive pit material generated by the tumbling, and wherein the rounded olive pit fragments are in an amount of at least 80.0 wt % of the total olive pit material generated by the tumbling.

3. The method of claim 1, further comprising:

mixing together with the olive pit fragments at least one of cork particles, and cherry pits whole, fragments, or mixtures thereof; and using the mixture as the infill or a component of the infill.

4. The method of claim 1, wherein the artificial turf infill comprises only bio-based materials and is free of any rubber, elastomeric, polymer-based infill, and sand.

5. The method of claim 1, wherein the method is free of a step which crushes or grinds the not-yet rounded olive pit fragments or the rounded olive-pit fragments.

6. The method of claim 2, further comprising thermally treating the olive pit fragments to a temperature of 80° C. to 250° C.

7. The method of claim 6, wherein the tumbling and the thermally treating are performed simultaneously in a thermo-tumbler apparatus, wherein the thermal treatment includes feeding hot air, steam, or superheated steam in the thermo-tumbler apparatus; and/or wherein the olive pit fragments which are fed to the thermo-tumbler apparatus are products of an olive oil press using compression to extract olive oil from olives.

8. A method of creating an artificial turf, comprising:

installing an artificial turf; and applying the artificial turf infill created according to the method of claim 2 on a carrier of the installed artificial turf or on an existing infill layer, wherein the artificial turf infill comprises at least a mixture of the rounded olive pit fragments and of the olive pit particles, wherein the applying of the artificial turf infill is performed in a single step, and allowing the olive pit particles in the applied infill to segregate from the rounded olive pit fragments and automatically trickle down into voids between the olive pit fragments.

9. The method of claim 8, wherein the artificial turf has a two-layer structure comprising a stabilization layer and a performance layer on top of the stabilization layer, wherein at least one of the stabilization layer and the performance layer comprises microporous zeolite particles; and/or wherein the performance layer comprises at least one other bio-based material.

10. A method of creating an artificial turf infill, the method comprising:

providing olive pit fragments;

tumbling the olive pit fragments to produce an olive pit material comprising rounded olive pit fragments;

thermally treating the olive pit material to a temperature of 80°° C. to 250° C., and using the olive pit material as the artificial turf infill or as a component of the artificial turf infill, wherein a total olive pit material generated by the tumbling has a bimodal size distribution with a major mode and a minor mode, wherein the major mode comprises the rounded olive pit fragments and has a peak between 0.5 mm to 4.0 mm, and wherein the minor mode comprises the rounded olive pit fragments of a size less than 63 μm has a peak at less than 63 μm.

11. The method of claim 10, wherein the olive pit material is thermally treated to a temperature of 150° C. to 250° C.

12. The method of claim 10, wherein the tumbling and the thermally treating are performed simultaneously in a thermo-tumbler apparatus, wherein the thermal treatment includes feeding hot air, steam, or superheated steam in the thermo-tumbler apparatus, and/or wherein the olive pit fragments which are fed to the thermo-tumbler apparatus are products of an olive oil press using compression to extract olive oil from olives.

13. The method of claim 10, further comprising:

mixing together with the rounded and thermally treated olive pit fragments at least one of cork particles, and cherry pits whole, fragments, or mixtures thereof; and using the mixture as the infill or a component of the infill.

14. A method of creating an artificial turf infill, the method comprising:

providing olive pit fragments and microporous zeolite particles;

mixing the microporous zeolite particles together with the olive pit fragments to form a mixture and tumbling the mixture in a thermo-tumbler apparatus to form rounded olive pit fragments, wherein the microporous zeolite particles enhance the rounding of sharp edges of the olive pit fragments; and using the rounded olive pit fragments and the microporous zeolite particles as the infill or as components of the infill.

\* \* \* \* \*